US008260367B2

(12) United States Patent
Chan

(10) Patent No.: US 8,260,367 B2
(45) Date of Patent: Sep. 4, 2012

(54) MOTION DRIVEN FOLLOW-UP ALERTS FOR MOBILE ELECTRONIC DEVICE

(75) Inventor: Weng Chong (Peekay) Chan, Tigard, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 747 days.

(21) Appl. No.: 12/001,557

(22) Filed: Dec. 12, 2007

(65) Prior Publication Data

US 2009/0156172 A1 Jun. 18, 2009

(51) Int. Cl.
*H04M 1/00* (2006.01)
(52) U.S. Cl. ........ 455/567; 340/7.58; 340/7.59; 340/7.6
(58) Field of Classification Search ............... 455/556.1; 340/7.58–7.62
See application file for complete search history.

(56) References Cited

U.S. PATENT DOCUMENTS

| 5,281,961 | A | 1/1994 | Elwell ............................ 340/825 |
| 6,067,460 | A * | 5/2000 | Alanara et al. ................. 455/574 |
| 6,594,354 | B1 | 7/2003 | Kelly ........................ 379/201.1 |
| 6,813,491 | B1 * | 11/2004 | McKinney ................. 455/414.1 |
| 6,933,923 | B2 | 8/2005 | Feinstein ..................... 345/158 |
| 7,162,026 | B2 | 1/2007 | Furnas ..................... 379/376.02 |
| 7,212,827 | B1 | 5/2007 | Veschl ........................ 455/456.1 |
| 2002/0111198 | A1 * | 8/2002 | Heie .............................. 455/574 |
| 2004/0204153 | A1 * | 10/2004 | Benco et al. .................. 455/567 |
| 2008/0280641 | A1 * | 11/2008 | Kristensson et al. ....... 455/556.1 |

FOREIGN PATENT DOCUMENTS

| JP | 2002-325115 | 11/2002 |
| JP | 2002-344567 | 11/2002 |
| JP | 2003-134189 | 5/2003 |
| JP | 2003-152832 | 5/2003 |
| JP | 2003-333129 | 11/2003 |
| JP | 2006-094421 | 4/2006 |
| JP | 2006-303565 | 11/2006 |
| JP | 2008-283444 | 11/2008 |

* cited by examiner

*Primary Examiner* — Marcos Batista
(74) *Attorney, Agent, or Firm* — Scot A. Reader

(57) ABSTRACT

A motion driven event alert system and method synchronize output of follow-up event alerts on a mobile electronic device to changes in the state of motion of the device. Generally, the device outputs an initial alert in response to receipt of a new event from a wireless network. If a user fails to take action on the device after the device outputs the initial alert, the device determines a state of motion of the device and monitors for a change in the state of motion. When a change is detected, the device outputs a follow-up alert. If the user fails to take action on the device after the device outputs the follow-up alert, the device repeats the steps of motion state determination, motion state change monitoring, motion state change detection and output of another follow-up alert.

19 Claims, 3 Drawing Sheets

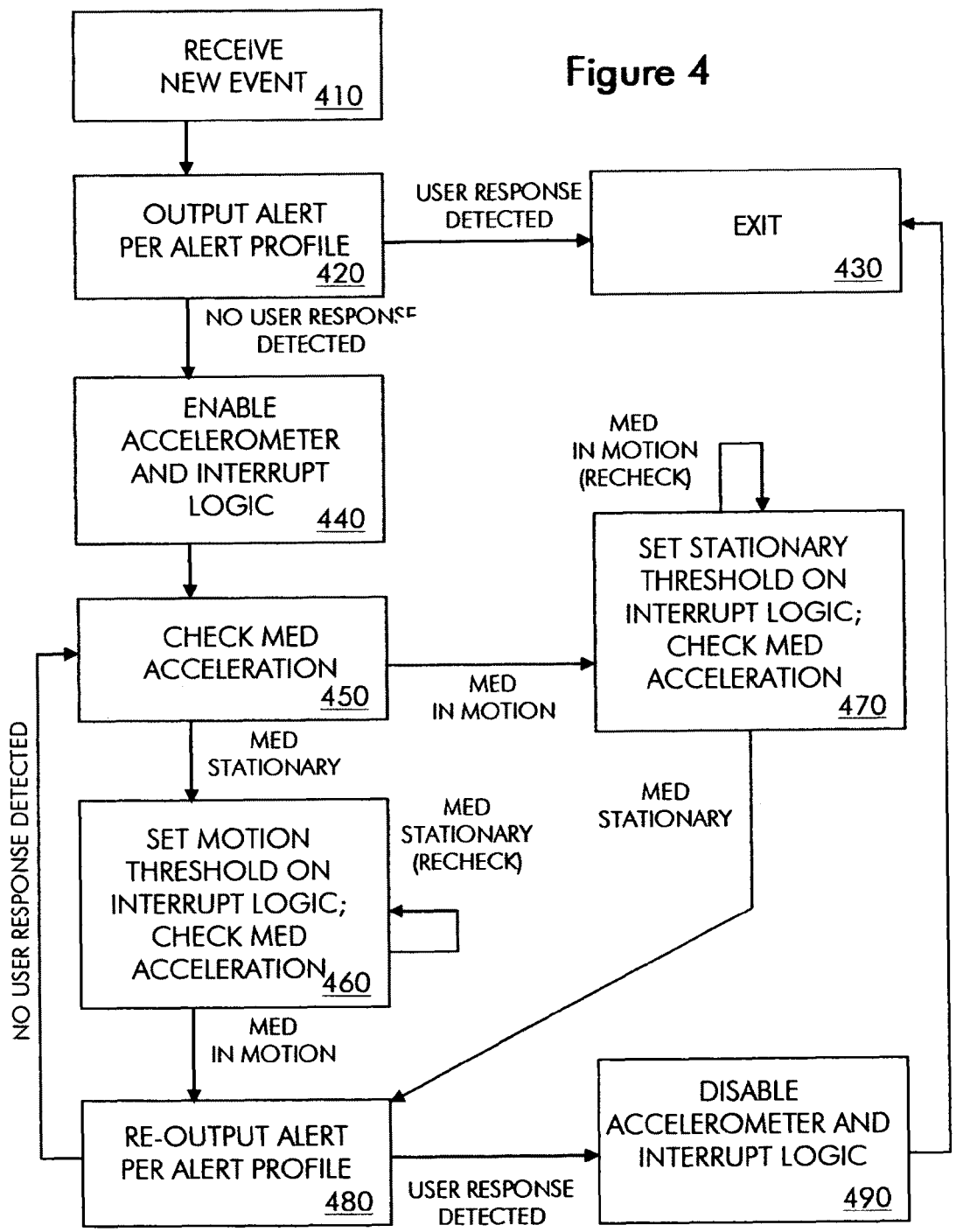

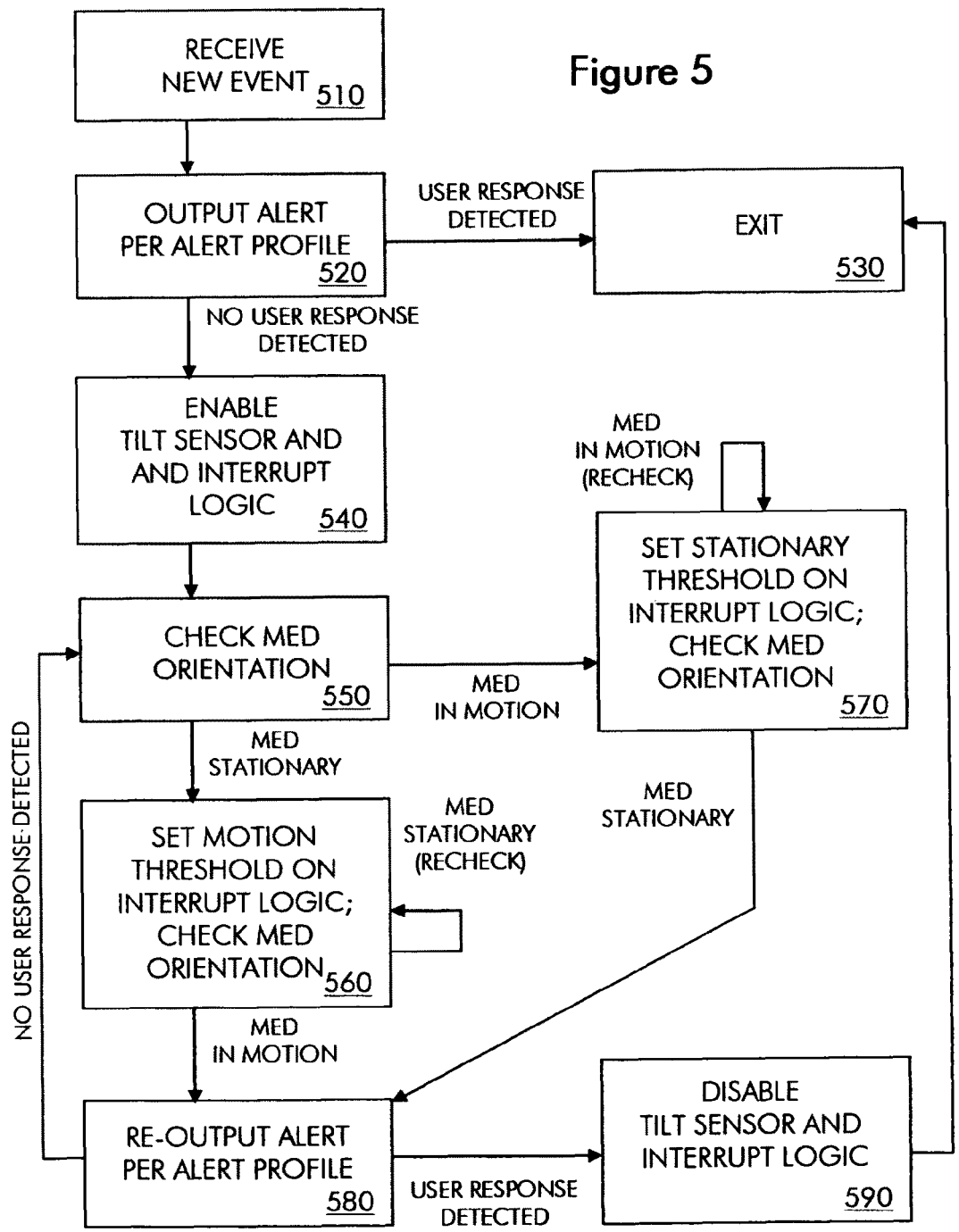

MOTION DRIVEN FOLLOW-UP ALERTS FOR MOBILE ELECTRONIC DEVICE

BACKGROUND OF THE INVENTION

The present invention relates to alerting a user of a mobile electronic device of a new event and, more particularly, to synchronizing output of follow-up event alerts on a mobile electronic device to changes in the state of motion of the device.

Mobile electronic devices, such as cellular phones and personal data assistants (PDA), notify users of new events, such as new text and voicemail messages, received from a wireless network in various ways. Many mobile electronic devices output initial alerts respecting new events when the new event arrives from the wireless network. If the user does not take action on the device (e.g. opening a flip cover or pressing a key on the device) in response to the initial alert, however, mobile electronic devices output follow-up alerts using various approaches. To improve the chance of prompt notification, some mobile electronic devices output periodic follow-up alerts until the user takes action on the device. However, if the user does not take such action soon after these follow-up alerts begin, these follow-up alerts can drain the battery and annoy people in the vicinity of the device. To avoid battery drain and annoyance of other people, other mobile electronic devices wait until the user takes action on the device before outputting follow-up alerts. However, if the user does not take such action soon after the new event is received from the wireless network, the new event may be stale by the time it is read or heard by the user.

SUMMARY OF THE INVENTION

The present invention, in a basic feature, synchronizes output of follow-up event alerts on a mobile electronic device to changes in the state of motion of the device. Generally, the device outputs an initial alert in response to receipt of a new event from a wireless network. If a user fails to take action on the device after the device outputs the initial alert, the device determines a state of motion of the device and monitors for a change in the state of motion. When a change in the state of motion is detected, the device outputs a follow-up alert. If the user fails to take action on the device after the device outputs the follow-up alert, the device repeats the steps of motion state determination, motion state change monitoring, motion state change detection and output of another follow-up alert.

The invention takes advantage of the fact that a change in the state of motion of a mobile electronic device may be indicative of reacquisition of the mobile electronic device by its user after a period of separation and is therefore a smart time to output a follow-up alert. Consider, for example, an employee who walks into an office and places a bag containing her cell phone on a desk while she goes to the break room for a cup of coffee. While the employee is in the break room, a text message from a client arrives on the cell phone via the wireless network. Although the employee does not hear an initial alert output on the device upon receipt of the text message, the employee does hear a follow-up alert output on the device when the employee returns and picks-up the bag. Moreover, since the device does not output a follow-up alert until the employee picks-up the bag, battery power is conserved and other employees in the vicinity are spared annoyance.

In one aspect of the invention, a mobile electronic device comprises a wireless communication interface, motion detection logic, an output interface and a processor communicatively coupled with the wireless communication interface, the motion detection logic and the output interface, wherein in response to a change in state of motion of the mobile electronic device detected by the motion detection logic and under control of the processor the output interface outputs an alert respecting an event received on the wireless communication interface.

In some embodiments, the alert is a follow-up alert that follows an initial alert respecting the event output under control of the processor on the output interface in response to receipt of the new event on the wireless communication interface.

In some embodiments, the mobile electronic device further comprises an input interface and a memory communicatively coupled with the processor, and a type for the alert is determined from an alert profile stored in the memory in response to input on the input interface.

In some embodiments, the motion detection logic comprises an accelerometer.

In some embodiments, the motion detection logic comprises a tilt sensor.

In some embodiments, the change in state of motion is a change from stationary to in motion.

In some embodiments, the change in state of motion is a change from in motion to stationary.

In some embodiments, the motion detection logic comprises sensor logic and the change in state of motion is detected based on a comparison of data collected by the sensor logic with a motion threshold.

In some embodiments, the alert comprises an audible alert.

In some embodiments, the alert comprises a visual alert.

In some embodiments, the alert comprises a tactile alert.

In some embodiments, the event comprises a text message.

In some embodiments, the event comprises a voicemail message.

In another aspect of the invention, a method for alerting a user of a mobile electronic device of an event received on the mobile electronic device from a wireless network comprises the steps of receiving on a mobile electronic device an event, outputting on the mobile electronic device an initial alert respecting the event, detecting on the mobile electronic device a state of motion of the mobile electronic device, detecting on the mobile electronic device a change in the state of motion of the mobile electronic device and outputting on the mobile electronic device in response to the detected change a follow-up alert respecting the event.

In some embodiments, the method further comprises the steps of receiving on the mobile electronic device an alert profile input by the user and determining a type for the alert based on the alert profile.

In some embodiments, the detected change comprises a change in acceleration.

In some embodiments, the detected change comprises a change in pitch or roll.

In some embodiments, the alert comprises an audible, visual or tactile alert.

In some embodiments, the event comprises a text or voicemail message.

These and other aspects of the invention will be better understood by reference to the following detailed description taken in conjunction with the drawings that are briefly described below. Of course, the invention is defined by the appended claims.

BRIEF DESCRIPTION OF THE DRAWINGS

FIG. 4 shows a method for synchronizing output of new event alerts on a mobile electronic device to changes in state of motion of the mobile electronic device detected by an accelerometer in some embodiments of the invention.

FIG. 5 shows a method for synchronizing output of new event alerts on a mobile electronic device to changes in state of motion of the mobile electronic device as detected by a tilt sensor in some embodiments of the invention.

DETAILED DESCRIPTION OF A PREFERRED EMBODIMENT

Figure 1:
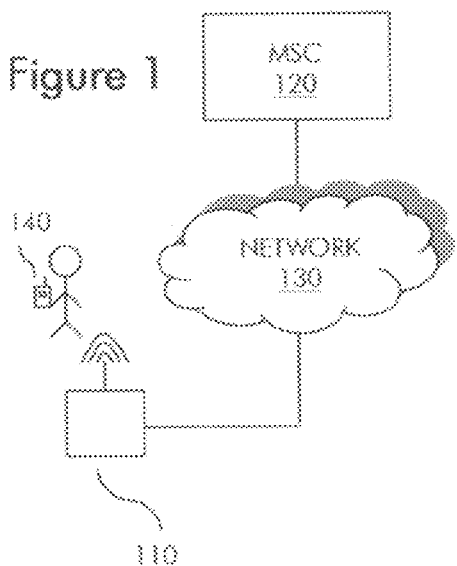
FIG. 1 shows a communication system in which the invention is operative in some embodiments.

FIG. 1 shows a communication network in which the invention is operative in some embodiments. The communication network includes a mobile electronic device 140 operated by a subscriber of the communication system. Mobile electronic device 140 is within range of network access point 110, which is communicatively coupled with a message service center (MSC) 120 via communication network 130.

Network access point 110 is a wireless communication gateway, such as a cellular base station or wireless local area network (LAN) access point, that provides access to the networking system to subscribers who operate mobile electronic devices in range of network access point 110.

Message service center 120 includes one or more server computers that temporarily store and deliver new events, such as text and/or voicemail messages, to subscribers of the networking system. In some embodiments, message service center 120 comprises a Short Message Service Center (SMSC) for temporarily storing and delivering Short Message Service (SMS) text messages to subscribers of the networking system.

Communication network 130 includes one or more data communication networks, such as Internet Protocol (IP)-based LANs and Wide Area Networks (WANs), Global System for Mobile Communications (GSM) networks, Universal Mobile Telecommunications System (UMTS) networks, Code Division Multiple Access (CDMA) networks, Worldwide Interoperability for Microwave Access (WiMax) networks, ad-hoc networks and/or other networks. Communication network 130 may include multiplexing nodes, such as routers, switches, bridges or hubs, that operate to communicatively couple communication nodes, such as network access point 110 and message service center 120. In some embodiments, communication network 130 includes one or more GSM, UMTS and/or CDMA networks.

Figure 2:
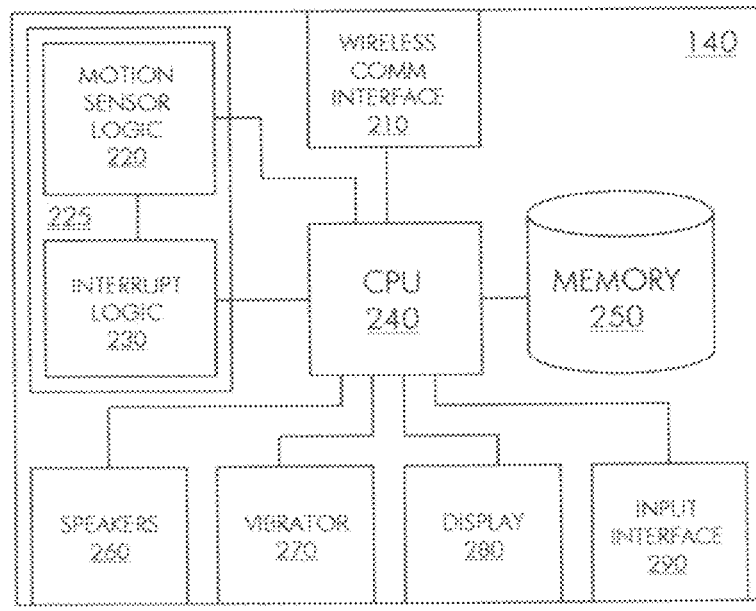
FIG. 2 shows a mobile electronic device in which the invention is operative in some embodiments.

Mobile electronic device 140 is a handheld communication device, such as a cellular phone, IP phone or PDA that has wireless text messaging and/or voicemail capabilities. FIG. 2 shows mobile electronic device 140 in more detail to include a wireless communication interface 210, motion detection logic 225, memory 250, speaker 260, vibrator 270, display 280 and input interface 290, all of which are communicatively coupled with a processor (CPU) 240. Wireless communication interface 210 receives and transmits data, such at text and voicemail messages, over communication networks. Wireless communication interface 210 may be, for example, a cellular network interface or a wireless LAN interface. Memory 250 includes one or more random access memories (RAM) and one or more read only memories (ROM). Speakers 260 include a left speaker and a right speaker for providing audio output signals, including audible alerts, from device 140 at various tones and volumes including stereo output signals. Vibrator 270 is an electromechanical device that provides tactile output signals, including tactile alerts, from device 140 in the form of vibrations of one or more intensities. Display 280 is a panel, such as a liquid crystal display (LCD) panel or light emitting diode (LED) panel, for visually rendering inputs received on input interface 290 and outputs, such as visual alerts, output by device 140. Input interface 290 includes buttons for accepting inputs on device 140. Input interface 290 in some embodiments is a 12-key telephonic keypad supplemented with soft keys. Processor 240 is a microprocessor that executes software stored in memory 250 and interacts with elements 210, 225, 260, 270, 280, 290 to provide the features and functions supported by device 140, including synchronizing output of follow-up new event alerts on device 140 to changes in the state of motion of device 140.

Motion detection logic 225 includes motion sensor logic 220 and interrupt logic 230. Motion sensor logic 220 includes a sensor for collecting analog data indicative of motion of device 140 and an analog-to-digital (A/D) converter for converting the analog data into digital data for transmission to interrupt logic 230. Interrupt logic 230 receives the digitized data from motion sensor logic 220 and applies the data to identify a state of motion of device 140 and alert conditions. Interrupt logic 230 includes initialization logic, comparator logic and timer logic. The initialization logic applies the digitized data to identify a state of motion for device 140 and set a motion state change threshold at variance from the current state. The comparator logic samples the digitized data at a sampling frequency determined by the timer logic and compares the data with the motion state change threshold to detect the presence of an alert condition. An alert condition may occur, for example, if the digitized data continuously exceed the motion state change threshold over a predetermined time window. When the comparator logic detects an alert condition, interrupt logic 230 generates an interrupt to processor 240 triggering output under control of processor 240 of a follow-up alert respecting a new event on one or more of speaker 260, vibrator 270 or display 280.

In some embodiments, motion detection logic 225 is implemented in custom logic, such as one or more application specific integrated circuits (ASIC). In other embodiments, all or part of interrupt logic 230 may be implemented in software stored in memory 250 and having instructions executable by processor 240.

In some embodiments, motion sensor logic 220 measures acceleration of device 140. In these embodiments, logic 220 has an accelerometer that collects acceleration data that are digitized and applied in interrupt logic 230 to determine the state of motion and alert conditions. For example, an alert condition may be detected when acceleration continuously exceeds an acceleration threshold set at variance from a stationary state over a predetermined time window.

In other embodiments, motion sensor logic 220 measures orientation of device 140. In these embodiments, logic 220 has a tilt sensor that collects orientation data (e.g. pitch and roll) that are digitized and applied in interrupt logic 230 to determine a state of motion and alert conditions. For example, an alert condition may be detected when the orientation continuously exceeds an orientation change threshold set at variance from a stationary state over a predetermined time window.

Figure 3:
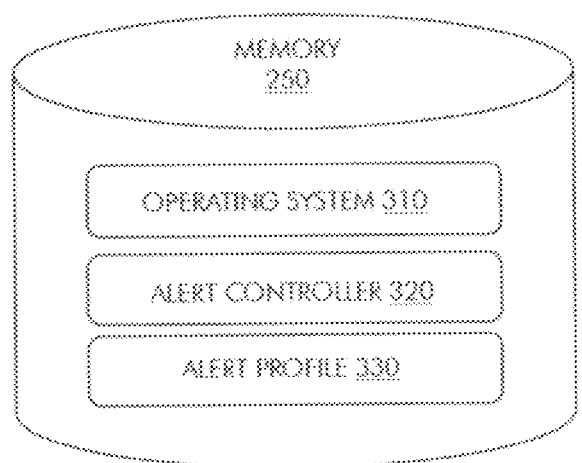
FIG. 3 shows functional elements stored in the memory of the mobile electronic device of FIG. 2 in some embodiments of the invention.

Turning to FIG. 3, functional elements stored in memory 250 are shown to include operating system 310, alert controller 320 and alert profile 330. Elements 310, 320, 330 are software programs having instructions executable by processor 240. Operating system 310 manages interactions between various elements 210, 225, 260, 270, 280, 290 of device 140. Alert controller 320 triggers output of an initial alert respecting a new event in accordance with alert profile 330 in response to receipt of the new event via wireless network, and subsequently outputs follow-up alerts respecting the new event in response to interrupts received from interrupt logic 230. Alert controller 320 also enables motion detection logic 225 after output of an initial alert and disables motion detection logic 225 after a user responds to an initial or follow-up alert. Alert profile 330 includes an alert type setting specifying one or more types of alerts, for example, audible, tactile and/or visual, that are to be output when output of an alert is indicated. Alert profile 330 is configurable by user through inputs on input interface 290.

FIG. 4 shows a method for synchronizing output of follow-up new event alerts on mobile electronic device 140 to changes in the state of motion of device 140 as detected by an accelerometer in some embodiments of the invention. In this method, a new event, such as a text or voicemail message, arrives on mobile electronic device 140 from message service center 120 via communication network 130 and network access point 110 (410). In response to the new event, alert controller 320 triggers output of an initial new event alert on one or more of speakers 260, vibrator 270 and/or display 280 as indicated by alert profile 330 (420). Alert controller 320 then waits a predetermined time for a user response to the initial alert. A user response may be, for example, opening a flip cover or pressing a key on device 140. If a user response is detected, the flow terminates (430). However, if no user response is detected, alert controller 320 enables motion detection logic 225, which in this method includes an accelerometer and interrupt logic 230 (440). Motion detection logic 225 then checks the state of motion of mobile electronic device 140 as measured in terms of acceleration (450). If the device 140 is stationary, interrupt logic 230 sets a motion threshold at variance with the stationary state that, when exceeded, is indicative that device 140 is in motion. Motion detection logic 225 then enters a loop in which interrupt logic 230 continually checks the acceleration of mobile electronic device 140 until the motion threshold is exceeded (460). Once the motion threshold is exceeded, an alert condition arises. Interrupt logic 230 interrupts processor 240 and alert controller 320 triggers output of a follow-up new event alert on one or more of speakers 260, vibrator 270 and/or display 280 as indicated by alert profile 330 (480). Alert controller 320 then waits a predetermined time for a user response to the follow-up alert. If a user response is detected, alert controller 320 disables motion detection logic 225 (490) and the flow terminates (430). However, if no user response is detected, alert controller 320 returns to Step 450. If, on the other hand, device 140 is in motion after the initial check at Step 450, interrupt logic 230 sets a stationary threshold at variance with the motion state that, when exceeded, is indicative that device 140 is stationary. Motion detection logic 225 then enters a loop in which interrupt logic 230 continually checks the acceleration of mobile electronic device 140 until the stationary threshold is satisfied (470). Once the stationary threshold is satisfied, an alert condition arises. Interrupt logic 230 interrupts processor 240 and alert controller 320 triggers output of a follow-up new event alert on one or more of speakers 260, vibrator 270 and/or display 280 as indicated by alert profile 330 (480). Alert controller 320 then waits a predetermined time for a user response to the follow-up alert. If a user response is detected, alert controller 320 disables motion detection logic 225 (490) and the flow terminates (430). However, if no user response is detected, alert controller 320 returns to Step 450.

FIG. 5 shows a method for synchronizing output of follow-up new event alerts on mobile electronic device 140 to changes in the state of motion of device 140 as measured by a tilt sensor in some embodiments of the invention. In this method, a new event, such as a text or voicemail message, arrives on mobile electronic device 140 from message service center 120 via communication network 130 and network access point 110 (510). In response to the new event, alert controller 320 triggers output of an initial new event alert on one or more of speakers 260, vibrator 270 and/or display 280 as indicated by alert profile 330 (520). Alert controller 320 then waits a predetermined time for a user response to the initial alert. A user response may be, for example, opening a flip cover or pressing a key on device 140. If a user response is detected, the flow terminates (530). However, if no user response is detected, alert controller 320 enables motion detection logic 225, which in this method includes a tilt sensor and interrupt logic 230 (540). Motion detection logic 225 then checks the state of motion of mobile electronic device 140 as measured in terms of changes in orientation (e.g. pitch and roll) (550). If the device 140 is stationary, interrupt logic 230 sets a motion threshold at variance with the stationary state that, when exceeded, is indicative that device 140 is in motion. Motion detection logic 225 then enters a loop in which interrupt logic 230 continually checks the orientation of mobile electronic device 140 until the motion threshold is exceeded (560). Once the motion threshold is exceeded, an alert condition arises. Interrupt logic 230 interrupts processor 240 and alert controller 320 triggers output of a follow-up new event alert on one or more of speakers 260, vibrator 270 and/or display 280 as indicated by alert profile 330 (580). Alert controller 320 then waits a predetermined time for a user response to the follow-up alert. If a user response is detected, alert controller 320 disables motion detection logic 225 (590) and the flow terminates (530). However, if no user response is detected, alert controller 320 returns to Step 550. If, on the other hand, the device 140 is in motion after the initial check at Step 550, interrupt logic 230 sets a stationary threshold at variance with the motion state that, when exceeded, is indicative that device 140 is stationary. Motion detection logic 225 then enters a loop in which interrupt logic 230 continually checks the orientation of mobile electronic device 140 until the stationary threshold is satisfied (570). Once the stationary threshold is satisfied, an alert condition arises. Interrupt logic 230 interrupts processor 240 and alert controller 320 triggers output of a follow-up new event alert on one or more of speakers 260, vibrator 270 and/or display 280 as indicated by alert profile 330 (580). Alert controller 320 then waits a predetermined time for a user response to the follow-up alert. If a user response is detected, alert controller 320 disables motion detection logic 225 (590) and the flow terminates (430). However, if no user response is detected, alert controller 320 returns to Step 550.

It will be appreciated by those of ordinary skill in the art that the invention can be embodied in other specific forms without departing from the spirit or essential character hereof. The present description is therefore considered in all respects to be illustrative and not restrictive. The scope of the invention is indicated by the appended claims, and all changes that come within the meaning and range of equivalents thereof are intended to be embraced therein.

What is claimed is:

1. A mobile electronic device, comprising:
a wireless communication interface;
motion detection logic;
an output interface; and a processor communicatively coupled with the wireless communication interface, the motion detection logic and the output interface, wherein in response to receiving an initial event via the wireless communication interface while the mobile electronic device is moving and under control of the processor the output interface outputs an initial alert respecting the initial event, and wherein before receiving any subsequent event via the wireless communication interface and in synchronization with a change in state of motion of the mobile electronic device from moving to stationary detected by the motion detection logic and under control of the processor the output interface outputs a follow-up alert respecting the initial event.

2. The device of claim 1, further comprising an input interface and a memory communicatively coupled with the processor, wherein a type for the alert is determined from an alert profile stored in the memory in response to input on the input interface.

3. The device of claim 1, wherein the motion detection logic comprises an accelerometer.

4. The device of claim 1, wherein the motion detection logic comprises a tilt sensor.

5. The device of claim 1, wherein the motion detection logic comprises sensor logic and the change in state of motion is detected based on a comparison of data collected by the sensor logic with a motion threshold.

6. The device of claim 1, wherein the alert comprises an audible alert.

7. The device of claim 1, wherein the alert comprises a visual alert.

8. The device of claim 1, wherein the alert comprises a tactile alert.

9. The device of claim 1, wherein the event comprises a text message.

10. The device of claim 1, wherein the event comprises a voicemail message.

11. A method for alerting a user of a mobile electronic device of an event received on the mobile electronic device from a wireless network, comprising the steps of:
receiving on a mobile electronic device an initial event while the mobile electronic device is moving;
outputting on the mobile electronic device an initial alert respecting the initial event; and before receiving any subsequent event on the mobile electronic device,
detecting on the mobile electronic device a change in the state of motion of the mobile electronic device from moving to stationary; and
outputting on the mobile electronic device in synchronization with the detected change in the state of motion a follow-up alert respecting the initial event.

12. The method of claim 11, further comprising the steps of:
receiving on the mobile electronic device an alert profile input by a user; and
determining a type for the alert based on the alert profile.

13. The method of claim 11, wherein the detected change comprises a change in acceleration.

14. The method of claim 11, wherein the detected change comprises a change in at least one of pitch or roll.

15. The method of claim 11, wherein the follow-up alert comprises an audible alert.

16. The method of claim 11, wherein the follow-up alert comprises a visual alert.

17. The method of claim 11, wherein the follow-up alert comprises a tactile alert.

18. The method of claim 11, wherein the event comprises a text message.

19. The method of claim 11, wherein the event comprises a voicemail message.

* * * * *

UNITED STATES PATENT AND TRADEMARK OFFICE
CERTIFICATE OF CORRECTION

| | | |
|---|---|---|
| PATENT NO. | : 8,260,367 B2 | Page 1 of 1 |
| APPLICATION NO. | : 12/001557 | |
| DATED | : September 4, 2012 | |
| INVENTOR(S) | : Weng Chong Chan | |

It is certified that error appears in the above-identified patent and that said Letters Patent is hereby corrected as shown below:

Column 8, lines 11-12, "change in the state of motion" is replaced with --change in state of motion--.

Signed and Sealed this
Thirteenth Day of November, 2012

David J. Kappos
*Director of the United States Patent and Trademark Office*